United States Patent [19]

Kirchweger et al.

[11] Patent Number: 4,945,873
[45] Date of Patent: Aug. 7, 1990

[54] INTERNAL COMBUSTION ENGINE WITH TWO INLET VALVES PER CYLINDER

[75] Inventors: Karl Kirchweger; Irolt Killmann, both of Graz, Austria

[73] Assignee: AVL Gesellschaft für Verbrennungskraftmaschinen und Messtechnik m.b.H. Prof. Dr.Dr.h.c. Hans List, Graz, Austria

[21] Appl. No.: 444,396

[22] Filed: Dec. 1, 1989

[30] Foreign Application Priority Data

Dec. 2, 1988 [AT] Austria .................................. 2967/88

[51] Int. Cl.$^5$ ............................................... F01L 3/00
[52] U.S. Cl. ............................... 123/188 M; 123/315; 123/432; 123/41.82 R; 123/308
[58] Field of Search ................... 123/432, 315, 188 M, 123/308, 41.82 R

[56] References Cited

U.S. PATENT DOCUMENTS

| | | | |
|---|---|---|---|
| 3,824,971 | 7/1974 | Skatsche et al. | 103/188 M |
| 3,832,983 | 9/1974 | Nickly | 123/188 M |
| 3,861,375 | 1/1975 | Excoffon | 123/188 M |
| 3,903,849 | 9/1975 | List et al. | 123/188 M |
| 4,688,524 | 8/1987 | Takahashi | 123/41.82 |
| 4,703,729 | 11/1987 | Sakano et al. | 123/188 M |
| 4,744,342 | 5/1988 | Ochiai | 123/308 |

FOREIGN PATENT DOCUMENTS

| | | | |
|---|---|---|---|
| 0170131 | 2/1986 | European Pat. Off. | |
| 687528 | 2/1953 | Fed. Rep. of Germany | 123/315 |
| 1576267 | 3/1970 | Fed. Rep. of Germany | 123/315 |
| 570007 | 5/1979 | Japan | 123/315 |

*Primary Examiner*—E. Rollins Cross
*Attorney, Agent, or Firm*—Watson, Cole, Grindle & Watson

[57] ABSTRACT

In an internal combustion engine with two or more cylinders and two inlet valves per cylinder, in which the intake passages of two adjacent cylinders, which lead towards the inlet valves, are located side by side, symmetrically relative to the symmetry plane of the two cylinders, and in which the cylinder head is made in one piece and has one common inlet flange with an inlet channel, which is flow-connected, past a lug receiving one of the cylinder head studs, with the intake passages formed by guiding surfaces and leading towards the individual inlet valves, the intake passages leading to the inlet valves positioned at a lesser distance in the direction of flow are guided on one side of the lug and the intake passages leading to the inlet valves positioned at a greater distance are guided on the other side of the lug, and the inlet valves of the adjacent cylinders are controlled in such a way that the cylinders are fed with combustion air at different points in time.

4 Claims, 2 Drawing Sheets

INTERNAL COMBUSTION ENGINE WITH TWO INLET VALVES PER CYLINDER

BACKGROUND OF THE INVENTION

This invention relates to an internal combustion engine with two or more cylinders, each of which is provided with two inlet valves, in which the intake passages of two adjacent cylinders, which lead up to the inlet valves, are located side by side, symmetrically relative to the symmetry plane of the two cylinders, and the cylinder head is made in one piece and has a common inlet flange with an inlet channel which is in flow-connection with the intake passages formed by guiding surfaces and leading to the individual inlet valves, past a lug receiving one of the cylinder head studs.

DESCRIPTION OF THE PRIOR ART

In conventional combustion engines of this kind the intake passage is configured such that the four valves are surrounded by an envelope and a connection is established with the inlet flange. Although this configuration makes good use of the available space it neglects such aspects as flow, which it leaves completely uncontrolled. The flow characteristics of such passages are poor and the flow cannot be directed so as to generate the necessary turbulence in the cylinder required for mixture-formation in a diesel engine.

The configurations presented in FIGS. 1 and 2, which have attempted to eliminate these faults, are characterized by another drawback, i.e. the narrow passage between the first valve and the lug for the cylinder head stud. As this lug must be placed approximately in this position in any type of engine and as the simplest kind of valve actuation also is obtained by positioning the valve in this area, the narrow cannot be avoided.

With conventional cylinder distances and lug dimensions the cross-section remaining for the passage is much smaller than would be desirable in view of the desired flow characteristics. This passage must cope with the entire volume of air for the second valve as seen in flow direction and part of the air volume for the first valve. If the passage towards the first valve is configured as a spiral passage in order to promote the generation of turbulences, as is shown in FIG. 2, in which the air is delivered to the valve excentrically, the volume of air from the first valve which has already been delivered into the cylinder, is comparatively small in the narrow passage, and an even greater part of the air volume for the first valve must pass the narrow in addition to the volume for the second valve. For this reason the flow characteristics in this variant again are unsatisfactory.

SUMMARY OF THE INVENTION

It is an object of this invention to avoid the disadvantages of the known types of design and to obtain optimal flow conditions and flow characteristics.

In the invention the intake passages leading to the inlet valves positioned at a laser distance in the direction of flow, are running on one side of the lug receiving the cylinder head stud, and the intake passages leading to the inlet valves positioned at a greater distance, are running on the other side of the lug, and the inlet valves of the adjacent cylinders are timed such that the combustion air is delivered at different points in time. When the valves of one of the cylinders are closed, the corresponding cylinder space of the passage is used for conveying air to the other cylinder. For adequate filling of the two cylinders sufficiently large cross-sections of the passage are available.

A suitable arrangement is described in EP-PS 0 170 131, in which the intake passages of the cylinder head are provided with two valves per cylinder. The two adjacent intake passages are connected via a passage, but they do not directly open into one another to form one single passage, and they do not have one joint inlet flange. The flow cross-section is not restricted, and the arrangement is aimed at generating a large swirl that is determined by the respective speed and is obtained by laterally adding a side stream to the main stream.

In further development of the invention the lug for the cylinder head stud may have four lateral faces, which will complement the guiding surfaces forming the intake passages. The lug will not impede the flow but will rather aid the forming of the intake passages.

The invention will permit the intake passages leading up to the close-lying inlet valves to be configured as swirl channels, thus delivering a sufficient amount of fresh charge to the inlet valve which is located further away. In this way optimal flow conditions are obtained in the cylinders.

DESCRIPTION OF THE DRAWINGS

Following is a more detailed description of the invention as illustrated by the attached drawings, in which.

Corresponding or identical parts are given the same reference numbers.

DETAILED DESCRIPTION OF THE PREFERRED EMBODIMENTS

Figure 1:
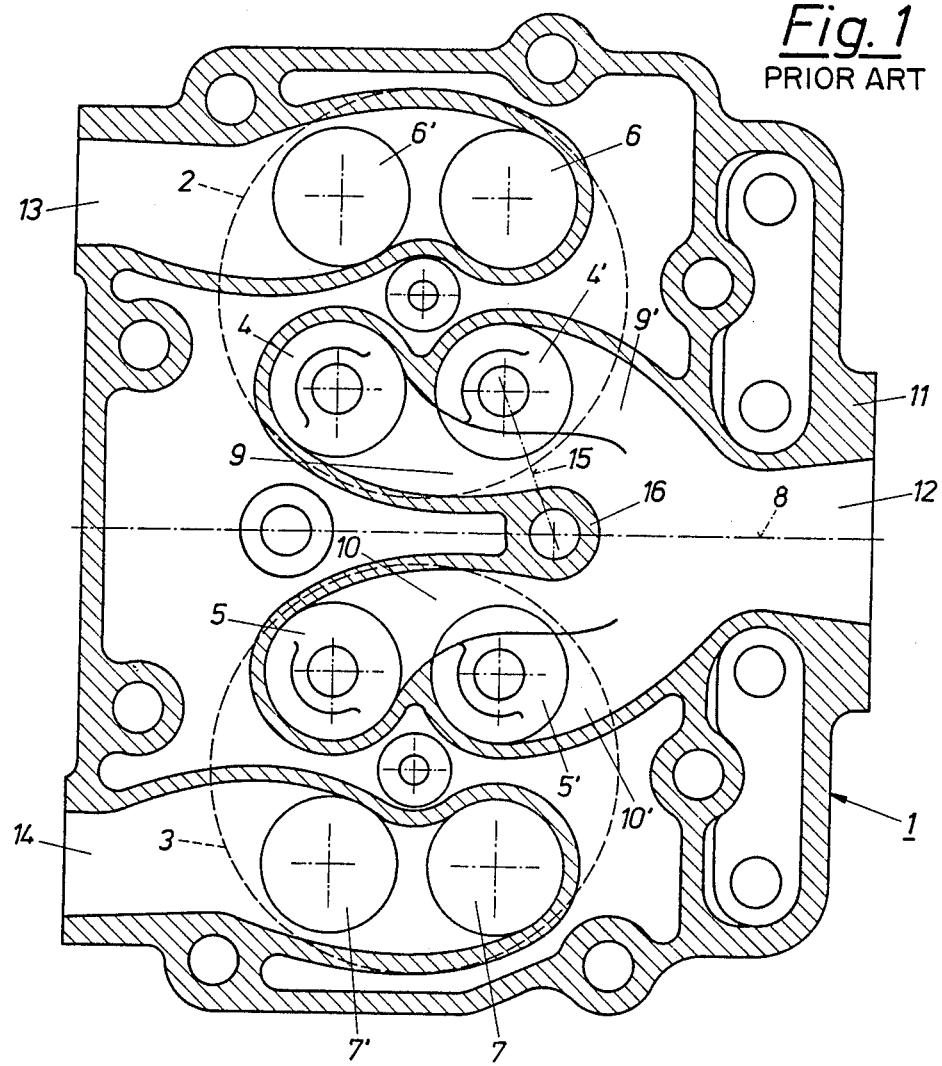
FIG. 1 presents the cylinder head of a known type of internal combustion engine.

The cylinder head 1 of an internal combustion engine of a known type, which is presented in FIG. 1, is cast in one piece and comprises two cylinders 2, 3 located side by side, which are indicated by the broken lines marking their bores. In the cylinder head 1 two inlet valves 4, 4' and 5, 5', and two exhaust valves 6, 6' and 7, 7' are provided for each cylinder 2, 3, which valves are positioned symmetrically relative to the symmetry plane 8 of the two cylinders 2, 3. The intake passages 9, 9' leading to the inlet valves 4, 4' and the intake passages 10, 10' leading to the inlet valves 5, 5' also are arranged symmetrically relative to the symmetry plane 8; these passages are supplied with charge from the inlet channel 12 going through the inlet flange 11. On the distant end of the cylinder head 1 opposite of the inlet flange 11 are the openings of the exhaust passages 13 and 14 leading away from the exhaust valves 6, 6' and 7, 7'.

This known type of design has its weak point in the narrow passage 15 between the first inlet valve 4' and the lug 16 receiving the cylinder head stud. This narrow must be passed by the entire fresh charge for the valve 4 and by part of the fresh charge for the valve 4'. With present-day conventional cylinder distances and lug dimensions this narrow is much smaller than would be necessary to ensure a satisfactory flow of fresh charge.

Figure 2:
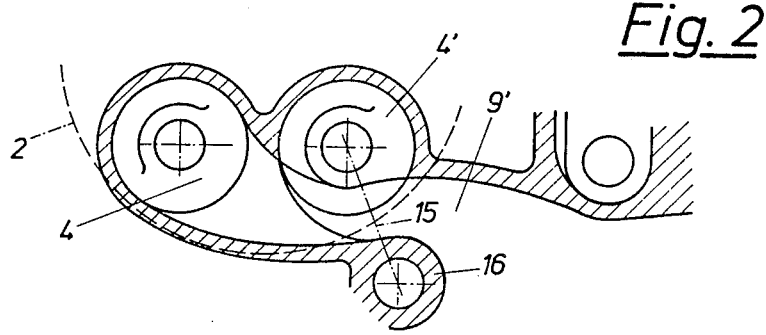
FIG. 2 presents a modified detail of the variant shown in FIG. 1.

If the passages 9' and 10' leading towards the inlet valves 4' and 5' are configured as spiral passages in order to generate a swirl in the cylinders 2 and 3, as is shown in FIG. 2, in which case the fresh charge is delivered to the valve excentrically, the volume of fresh charge for the inlet valve 4' will be even larger in the narrow passage 15, which volume must pass this narrow 15 in addition to the volume for valve 4. It is obvious that the flow characteristics cannot be satisfactory in this instance.

Figure 3:
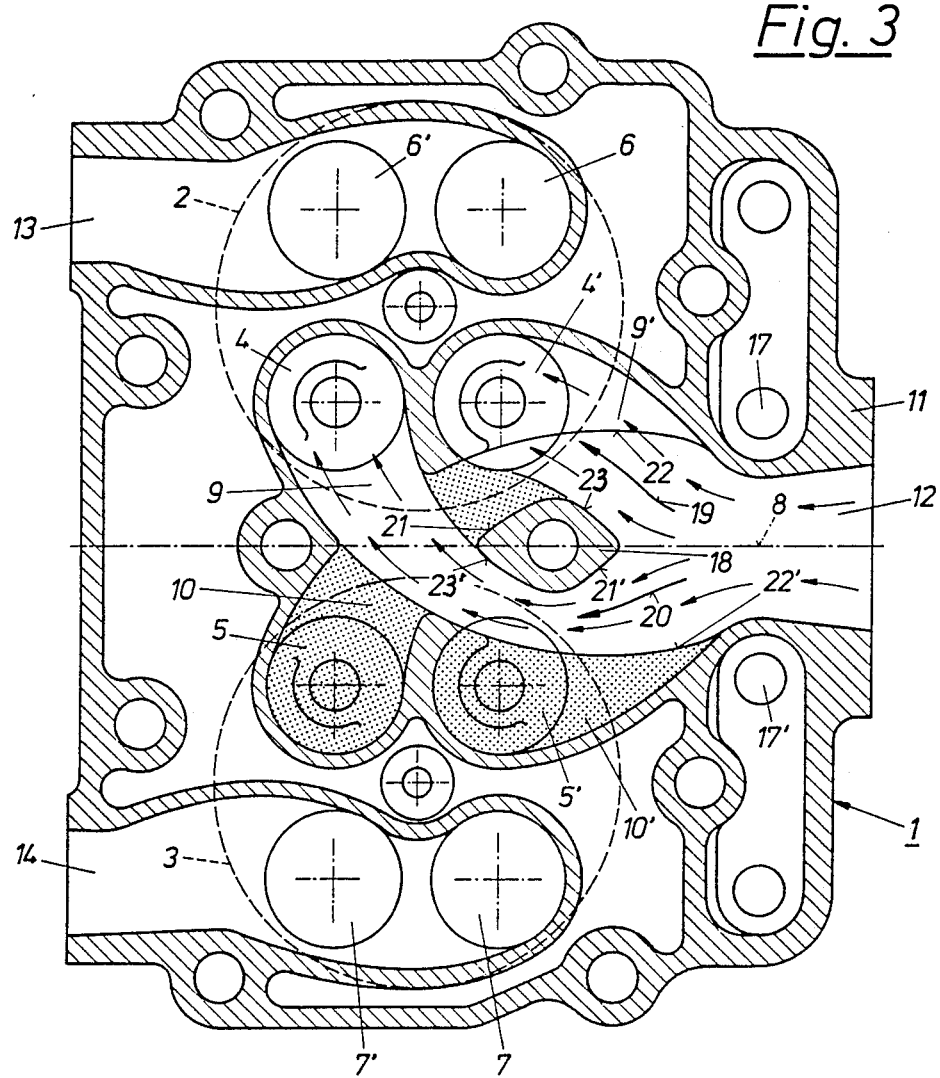
FIG. 3 presents a section of the cylinder head of an internal combustion engine according to the invention, normal to the cylinder axes.

The cylinder head 1 of an internal combustion engine according to the invention, which is presented in FIG. 3, also comprises two cylinders 2 and 3, each of which is provided with two inlet valves 4, 4' and 5, 5', which are arranged symmetrically relative to the symmetry plane 8, as are the exhaust valves 6, 6' and 7, 7'. Arriving from the inlet flange 11, the fresh charge passes between the tappets 17 and 17' for the inlet valves 4, 4' and 5, 5', and is divided at the lug 18 for one of the cylinder head studs into a stream 19 for the inlet valve 4', which is closer in flow direction, and a stream 20 for the inlet valve 4 of the cylinder 2 (upper cylinder in FIG. 3), which is further distant. Whereas the stream 19 reaches the valve 4' in a direct passage, the stream 20 makes a detour around the lug 18 for the cylinder head stud, using part of the passage of the adjacent cylinder 3, until it reaches the valve 4. While it is making use of this part of the passage the dotted spaces in this drawing form dead air pockets until conditions are reversed and the cylinder 3 is being filled. In this manner the cross-section at the narrow passage is available twice.

The inlet channel is marked 12, the intake passages towards the inlet valves 4 and 4' have the reference numbers 9 and 9', and the intake passages towards the inlet valves 5 and 5' have the reference numbers 10 and 10', respectively.

The lug 18 for a cylinder head stud (not shown here) has four lateral faces 21, 23, 21', 23' enhancing flow characteristics, which, together with the guiding surfaces 22 and 22', will act as boundaries of the streams 19 and 20.

Figure 4:
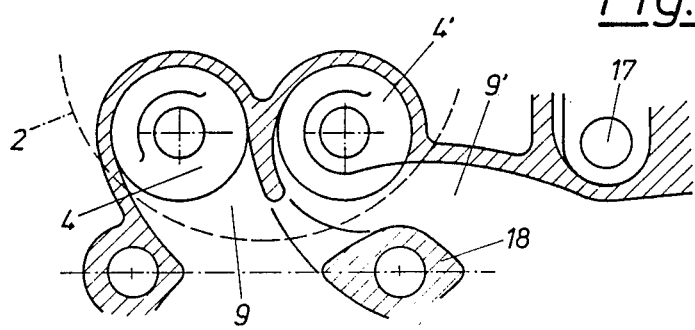
FIG. 4 presents a detail of FIG. 3 in modified form.

In the variant according to FIG. 4 the intake passage 9' is configured as a spiral passage. In this instance the improvements over the known type of design as shown in FIG. 2 are particularly significant.

We claim:

1. An internal combustion engine comprising a cylinder head made in one piece, having a common inlet flange with an inlet channel and at least two cylinders, each of said cylinders is provided with two inlet valves and two intake passages, wherein said intake passages of two adjacent cylinders leading up to said inlet valves, are located side by side, symmetrically relative to a symmetry plane of said two cylinders, said inlet channel is flow-connected with said intake passages formed by guiding surfaces and leading to said inlet valves, past a lug receiving a cylinder head stud, wherein said intake passages leading to said inlet valves positioned at a lesser distance in the direction of flow, are running on one side of said lug and said intake passages leading to said inlet valves positioned at a greater distance are running on the other side of said lug, and wherein said inlet valves of said adjacent cylinders are delivered with combustion air at different points in time.

2. An internal combustion engine according to claim 1, wherein said lug receiving a cylinder head stud has four lateral faces which will complement said guiding surfaces forming said intake passages.

3. An internal combustion engine according to claim 1, wherein said intake passages leading up to said close lying inlet valves are configured as swirl channels.

4. An internal combustion engine according to claim 2, wherein said intake passages leading up to said close lying inlet valves are configured as swirl channels.

* * * * *